(12) United States Patent
Hu et al.

(10) Patent No.: US 9,885,120 B2
(45) Date of Patent: Feb. 6, 2018

(54) APPARATUS AND A METHOD OF GENERATING BUBBLES AND FOAMS

(71) Applicant: KONINKLIJKE PHILIPS N.V., Eindhoven (NL)

(72) Inventors: Peixin Hu, Eindhoven (NL); Guangwei Wang, Eindhoven (NL); Jianyu Jin, Eindhoven (NL)

(73) Assignee: KONINKLIJKE PHILIPS N.V., Eindoven (NL)

( * ) Notice: Subject to any disclaimer, the term of this patent is extended or adjusted under 35 U.S.C. 154(b) by 447 days.

(21) Appl. No.: 14/409,753

(22) PCT Filed: Jun. 18, 2013

(86) PCT No.: PCT/IB2013/054995
§ 371 (c)(1),
(2) Date: Dec. 19, 2014

(87) PCT Pub. No.: WO2014/001964
PCT Pub. Date: Jan. 3, 2014

(65) Prior Publication Data
US 2015/0191836 A1    Jul. 9, 2015

(30) Foreign Application Priority Data

Jun. 27, 2012 (WO) ................ PCT/CN2012/077625

(51) Int. Cl.
*C25B 15/02* (2006.01)
*C25B 15/08* (2006.01)
(Continued)

(52) U.S. Cl.
CPC .......... *C25B 15/02* (2013.01); *B01F 3/04106* (2013.01); *B01F 3/04439* (2013.01);
(Continued)

(58) Field of Classification Search
CPC ... C25B 15/02; C25B 15/08; C25B 1/00–1/46
See application file for complete search history.

(56) References Cited

U.S. PATENT DOCUMENTS

| 4,039,439 A | 8/1977 | Clark |
| 4,627,897 A | 12/1986 | Tetzlaff |
| 5,593,554 A * | 1/1997 | Yamanaka ............ B01D 61/44 204/252 |
| 5,688,393 A | 11/1997 | Fleury |

(Continued)

FOREIGN PATENT DOCUMENTS

| CA | 1312219 C | 1/1993 |
| CN | 1987414 A * | 6/2007 |
| CN | 101984142 A | 3/2011 |
| DE | 102009025887 B3 | 1/2011 |

(Continued)

OTHER PUBLICATIONS

Guohua Chen, "Electrochemical technologies in wastewater treatment", Sep. 19, 2003, Separation and Purification Technology 38, pp. 11-41.

*Primary Examiner* — Nicholas A Smith

(57) ABSTRACT

The prior arts generate bubbles with fixed characteristics of the gas in the bubbles. The invention proposes an apparatus of generating bubbles and a method thereof. The apparatus comprising: a first unit (10) configured to determine at least one characteristic of a gas in the bubbles; a second unit (12) configured to generate the bubbles, comprising: an electrolyzer (120) configured to electrolyze an electrolyte to generate the gas in the electrolyte, thereby generating bubbles; and a controller (14), configured to control the second unit to generate the bubbles according to the at least one characteristic of the gas. In embodiments of the invention, the generation is controllable with respect to the gas in the bubble based on the practical requirement of the gas, and is more flexible and with wide applicability.

13 Claims, 6 Drawing Sheets

(51) Int. Cl.
*C25B 1/04* (2006.01)
*C25B 9/10* (2006.01)
*C25B 1/13* (2006.01)
*C25B 1/30* (2006.01)
*C25B 9/06* (2006.01)
*B01F 3/04* (2006.01)
*C25B 1/02* (2006.01)

(52) U.S. Cl.
CPC ............ *B01F 3/04446* (2013.01); *C25B 1/02* (2013.01); *C25B 1/04* (2013.01); *C25B 1/13* (2013.01); *C25B 1/30* (2013.01); *C25B 9/06* (2013.01); *C25B 9/10* (2013.01); *C25B 15/08* (2013.01); *B01F 2003/04914* (2013.01); *Y02E 60/366* (2013.01)

(56) References Cited

U.S. PATENT DOCUMENTS

| | | | |
|---|---|---|---|
| 2003/0155669 A1* | 8/2003 | Bronshtein | F26B 5/04 264/4.1 |
| 2009/0297633 A1 | 12/2009 | Sano | |
| 2012/0228145 A1* | 9/2012 | Guastella | C02F 1/4672 205/337 |

FOREIGN PATENT DOCUMENTS

| | | |
|---|---|---|
| JP | 2010138345 A | 6/2010 |
| JP | 201115780 A | 8/2011 |
| KR | 2004060095 A | 7/2004 |
| RU | 2095477 C1 | 11/1997 |
| TW | 240767 B | 10/2005 |

\* cited by examiner

APPARATUS AND A METHOD OF GENERATING BUBBLES AND FOAMS

This application is the U.S. National Phase application under 35 U.S.C. § 371 of International Application No. PCT/IB2013/054995, filed on Jun. 18, 2013, which claims the benefit of International Application No. PCT/CN2012/077625 filed on Jun. 27, 2012. These applications are hereby incorporated by reference herein.

TECHNICAL FIELD

The disclosure relates to generations of bubbles and foams containing the bubbles, particularly to generations of bubbles via generating gas.

BACKGROUND ART

Foam is generally formed by trapping a great number of gaseous bubbles in a liquid and widely used in people's daily life, for example, in shaving, surface cleaning, etc.

Generally, bubbles are generated and then subject to a surface activation process which reduce surface tension of the liquid so as to prevent the bubbles from breaking.

One popular method of generating bubbles is called mechanical rabbling. Specifically, air and liquid are mixed by mechanical rabbling to generate bubbles. Other methods include gas pumping, heating, etc.

However, the above methods of generating bubbles in order to generate foams are usually for industrial applications and have their own disadvantages such as high cost, high complexity and low controllability.

SUMMARY OF THE INVENTION

Comparing to liquid without bubbles inside, foam is easier to daub and has better penetrability. The difference in the penetrability is illustrated in FIGS. 1a and 1b. Referring to FIG. 1a, surface tension of the liquid holds the molecules together, resulting in larger droplets 10, which limits a total contact area between the liquid and a surface 12 and limits an absorption 14 into the surface 12. The flowability of water also decreases a duration of a contact between the droplet 10 and the surface 12. Referring to FIG. 1b, a foam 16, consisting of a number of bubbles 18 with larger contact area and the relatively lower flowability of foam 16, provides a longer contact time between the foam 16 and the surface 12. Additionally, the foam 16 normally has lower surface tension than that of larger droplets, therefore a deeper and faster penetration 14' into the surface 12 are also achieved, which dramatically raises the moisture content.

However, characteristic of the gas in the bubbles, such as the amount of the gas in each bubble and the type of the gas in the bubbles, provided by the above solutions is fixed. Therefore a user could not easily adapt an apparatus to generate bubbles with controllably different characteristics of the gas so as to meet different needs. For example, amount of gas in each bubbles can influence the tininess of the foam, while the type of the gas in the bubbles is closely related to the possible usage of the foam.

To better address one or more of these problems, it would be advantageous to have a technology of generating the bubbles that is controllable in the characteristic of the gas, e.g. according to the type of the gas and/or the practical usage of the bubbles that is relative to the type of the gas. It would be also advantageous to have a small-sized, low-noise apparatus for bubble and foams generation.

In a first aspect of the invention, it is provided an apparatus for generating bubbles, comprising:
  a first unit configured to determine at least one characteristic of a gas in the bubbles;
  a second unit configured to generate the bubbles, comprising:
    an electrolyzer configured to electrolyze an electrolyte to generate the gas in the electrolyte, thereby generating bubbles;
  a controller, configured to control the second unit to generate the bubbles according to the at least one characteristic of the gas.

According to this aspect, the controller controls the generation of the bubbles according to the characteristic of the gas in the bubbles, thus the bubble generation is controllable with respect to the gas in the bubbles based on practical requirements on the gas, and is more flexible. Additionally, the electrolyzer is generally in a small size and will not make lots of noise. Therefore, the apparatus is more user-friendly.

In a preferred embodiment, the electrolyzer comprises:
  a DC electric source;
  at least two anodes with different features and/or at least two cathodes with different features, which are coupled to the DC electric source;
  the controller is further configured to select, for electrolyzing the electrolyte, at least one said anode and/or at least one said cathode according to the characteristic of the gas.

In this embodiment, electrodes with different features are provided for selection to provide a required characteristic of the gas. Since the electrodes of the electrolyzer are small, the apparatus can be in a small dimension to comprise different electrodes to provide a diversity of characteristics of the gas.

In a further preferred embodiment, the electrolyzer comprises at least two of an inert anode, a active metal anode and an anode with double electric layer capacity, and/or
  the electrolyzer comprises at least two of an inert cathode, a metal cathode and an cathode with double electric layer capacity;
  the first unit determines on which one or more electrodes the gas is to be generated as the characteristic of the gas.

In this embodiment, the inert electrodes can generate gas while the active metal anode and the electrode with double electric layer capacity will not generate gas. Thus it is controllable that on which one or more electrodes the gas is to be generated.

The user may require bubbles with different tininesses respectively for different usages, for example the bubbles used in froth flotation are preferably with 1 mm diameter, bigger than that with 0.1 mm diameter used in cleaning. To provide different tininess, the apparatus should be controllable to provide different amount of the gas in each bubble. To address this, in a further preferred embodiment, the electrolyzer comprises at least two anodes in different sizes and/or shapes, and/or at least two cathodes in different sizes and/or shapes,
  the first unit determines an amount of the gas in each bubble and/or a tininess of the bubbles as the characteristic of the gas, and
  the controller is further configured to select at least one said anode and/or at least one said cathode according to the characteristic of the gas.

To provide different tininess of the bubbles, in an another preferred embodiment, the first unit determines an amount of the gas in each bubble and/or a tininess of the bubbles as the characteristic of the gas, and the controller is further configured to control a current and/or voltage used by the electrolyzer for the electrolyzing, according to the characteristic of the gas.

In these two embodiments, different tininesses of the bubbles can be provided by the apparatus to meet different requirement, and the applicability of the apparatus is therefore very wide.

In a preferred embodiment, the apparatus generates foams from the bubbles, and the electrolyte is added with surfactant. In this embodiment, since the bubbles are generated controllably, the foams are also generated controllably.

In a preferred embodiment, the apparatus generates foams from the bubbles, the first unit is configured to determine an amount of the foam, and, the second unit further comprises:
  a surface activity unit configured to provide the bubbles with the surface activity, comprising at lease one of:
  a dispenser configured to dispense surfactants into the electrolyte, and the controller controls a type and/or a concentration of the surfactant according to the amount of the foam; or
  an intermediate infrared source configured to generate a radiation of intermediate infrared to the bubbles, and the controller controls an applying duration and/or a strength of radiation of the source according to the amount of the foam; or
  a magnet module configured to yield a magnetic field for the bubble, and the controller controls an applying duration and/or a strength of the magnetic field of the magnet module according to the amount of the foam.

In these embodiments, since the bubbles are generated controllably with respect to the gas in the bubbles, the foams are also generated controllably with respect to the gas in the foams. Besides, the amount of the foams can also be controlled, thus the apparatus is more flexible.

The user may prefer to have different types of the gas in the bubbles for different usages. For example, in disinfection, bubbles enriched by ozone ($O_3$) are preferred; while in skin care, bubbles enriched by oxygen ($O_2$) are required. Thus it would be advantageous for the apparatus controllable in generating the bubbles with respect to the type of the gas in the bubble and/or the usage of the bubble.

To address this, in a preferred embodiment, the type of the gas can be controlled by the current and/or voltage of the electrolysis. Specifically, the first unit determines a type of the gas in the bubbles and/or a usage of the bubbles as the characteristic of the gas, and the controller is further configured to control a voltage used by the electrolyzer for the electrolyzing, according to the characteristic of the gas.

In another preferred embodiment, the first unit determines a type of the gas in the bubbles and/or a usage of the bubbles as the characteristic of the gas, the second unit further comprises an electrolyte source of at least two types of electrolyte, and the controller controls the electrolyte source to provide at least one said electrolyte according to the characteristic of the gas.

In this embodiment, the apparatus can provide bubbles with controllably different types of gas and for different usages, thus the applicability of the apparatus is therefore very wide.

In a preferred embodiment, the electrolyte source comprises:
  at least one cation releasing module, each of which is configured to release at least one type of cations;
  at least one anion releasing module, each of which is configured to release at least one type of anions;

the controller is configured to:
  determine a type of cation to release and/or a type of anion to release according to the characteristic of the gas; and
  select and manipulate at least one said cation releasing module and/or at least one said anion releasing module according to the determined types of the cations and/or anions.

In this embodiment, since the ions in the electrolyte are electrolyzed to generate the gas, the apparatus selects the proper cations and the anions respectively according to the type of gas for a certain usage. The applicability of the apparatus is therefore very wide.

In a further preferred embodiment, the cation releasing module comprises a first container for containing a first solution containing a first type of cation, the first container having a layer of cationic membrane for separating the first solution with the electrolyte,
  the controller is configured to apply a positive voltage in the first solution such that said first type of cation are released into the electrolyte through the cationic membrane; and/or
  the anion releasing module comprises a second container for containing a second solution containing a second type of anion, the second container has a layer of anionic membrane for separating the second solution with the electrolyte,
  the controller is configured to apply a negative voltage in the second solution such that said second type of anions is released into the electrolyte through the anionic membrane.

This embodiment provides specific implementations for the cation releasing module and the anion releasing module.

In a further preferred embodiment, wherein the cation releasing module comprises a cation complexed polymer and/or gel storing the cation and configured to immerse in the solution,
  the controller (14) is configured to electrolyze water in the solution and generate $H^+$ ions which enter the cation complexed polymer and/or gel and exchange said type of cation out of the polymer and/or gel and into the solution; and/or
  the anion releasing module comprises an anion complexed polymer and/or gel storing the anion and configured to immerse in the solution,
  the controller is configured to electrolyze water in the solution and generate $OH^-$ ions which enter the anion complexed polymers and/or gels and exchange said type of anion out of the polymers and/or gels and into the solution.

This embodiment provides still other specific implementations for the cation releasing module and the anion releasing module. The polymers and/or gels are easy to be replaced and cost effective.

In some cases, the product of the electrolyzing can react with a chemical to generate the gas, for example the $H^+$ can react with a calcium carbonate ($CaCO_3$) to generate a carbon dioxide ($CO_2$). In a preferred embodiment, the first unit determines a type of the gas in the bubbles and/or a usage of the bubbles as the characteristic of the gas, and the second unit further comprising:
  a chemical adding unit configured to add at least two kinds of chemicals into the electrolyte, each of which reacts with a product of the electrolyzing of the electrolyte to generate the gas;
  and the controller is further configured to control the chemical adding unit to add at least one said chemical according to the characteristic of the gas.

This embodiment has a wide applicability.

In a preferred embodiment, the first unit comprises at least one of:

a user interface configured to receive the characteristic of the gas from a user;

a machine-to-machine interface configured to receive the characteristic of the gas from a device adapted to utilize the bubbles.

In one embodiment, the apparatus can be controlled directly by the user via the user interface. In another embodiment, the apparatus can be connected to and controlled via the machine-to-machine interface by a device adapted to utilize the bubbles, such as a washing machine or dishwasher. The machine-to-machine interface can be unified among lots of home appliances, and therefore the apparatus can be universal for providing these appliances with proper bubbles.

Since the surface tension of the liquid will break the bubbles to avoid the generation of foams, in order to accumulate bubbles to obtain foams, a surface activation method is adopted in foam generation, which can reduce the surface tension of water to maintain the stability of bubble, whereby the foam is formed by accumulation of bubbles.

In a second aspect of the invention, it is provided a method for generating bubbles, and the method is carried out by the apparatus according to the first aspect of the invention. For example, the method comprises steps of:

determining at least one characteristic of the gas in the bubbles;

electrolyzing an electrolyte to generate the gas in the electrolyte, thereby generating the bubbles, according to the at least one characteristic of the gas.

These and other features of the present invention will be described in details in the embodiment part.

BRIEF DESCRIPTION OF THE DRAWINGS

Features, aspects and advantages of the present invention will become obvious by reading the following description of non-limiting embodiments with the aid of appended drawings.

Wherein, the same or similar reference sign refers to the same or similar component/module.

DETAILED DESCRIPTION OF EMBODIMENTS

Figure 1A:
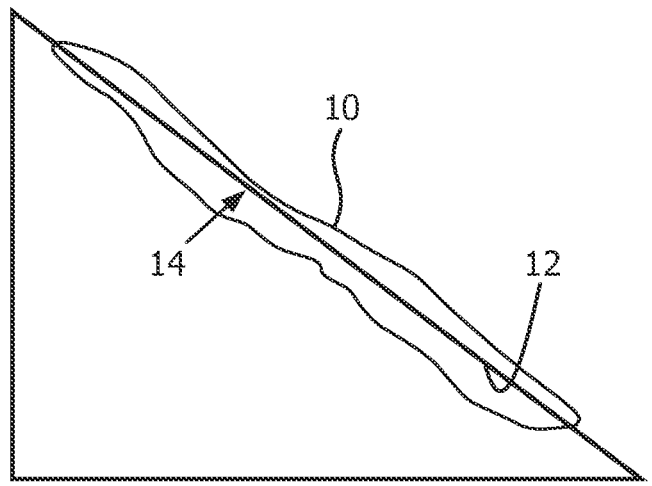
FIG. 1a schematically shows an absorption of large droplets into a surface.
Figure 1B:
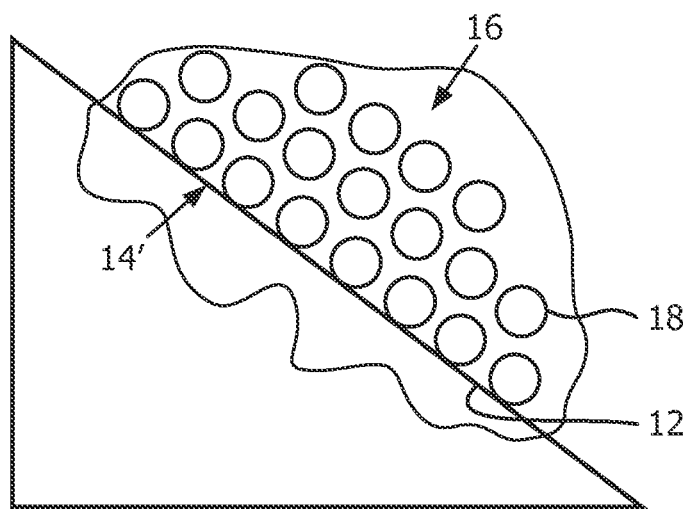
FIG. 1b schematically shows an absorption of foams into a surface.
Figure 2:
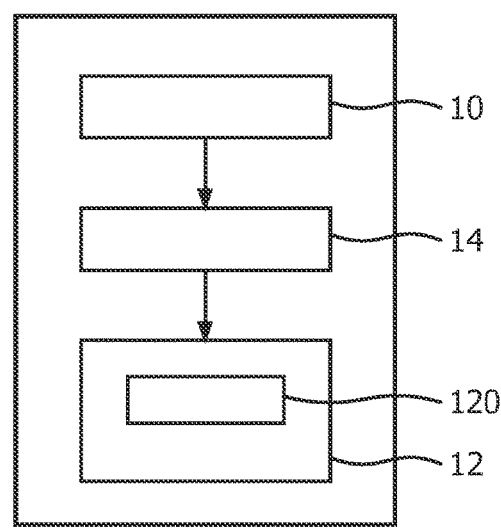
FIG. 2 shows a schematic block diagram of the apparatus according to an embodiment of the invention.

FIG. 2 shows a schematic block diagram of the apparatus according to an embodiment of the invention. The apparatus 1 for generating bubbles comprises:

a first unit 10 configured to determine at least one characteristic of a gas in the bubbles;

a second unit 12 configured to generate the bubbles, comprising:

an electrolyzer 120 configured to electrolyze an electrolyte to generate the gas in the electrolyte, thereby generating bubbles;

a controller 14, configured to control the second unit 12 to generate the bubbles according to the at least one characteristic of the gas.

As to the method aspect, the embodiment of the invention provides a method for generating bubbles, and the method is carried out by the apparatus 1. Specifically, the method comprises steps of:

determining at least one characteristic of a gas in the bubbles;

electrolyzing an electrolyte to generate the gas in the electrolyte, thereby generating bubbles, according to the characteristic of the bubbles.

In one embodiment, the bubbles with different gas characteristics are generated by using different electrodes.

Figure 3:
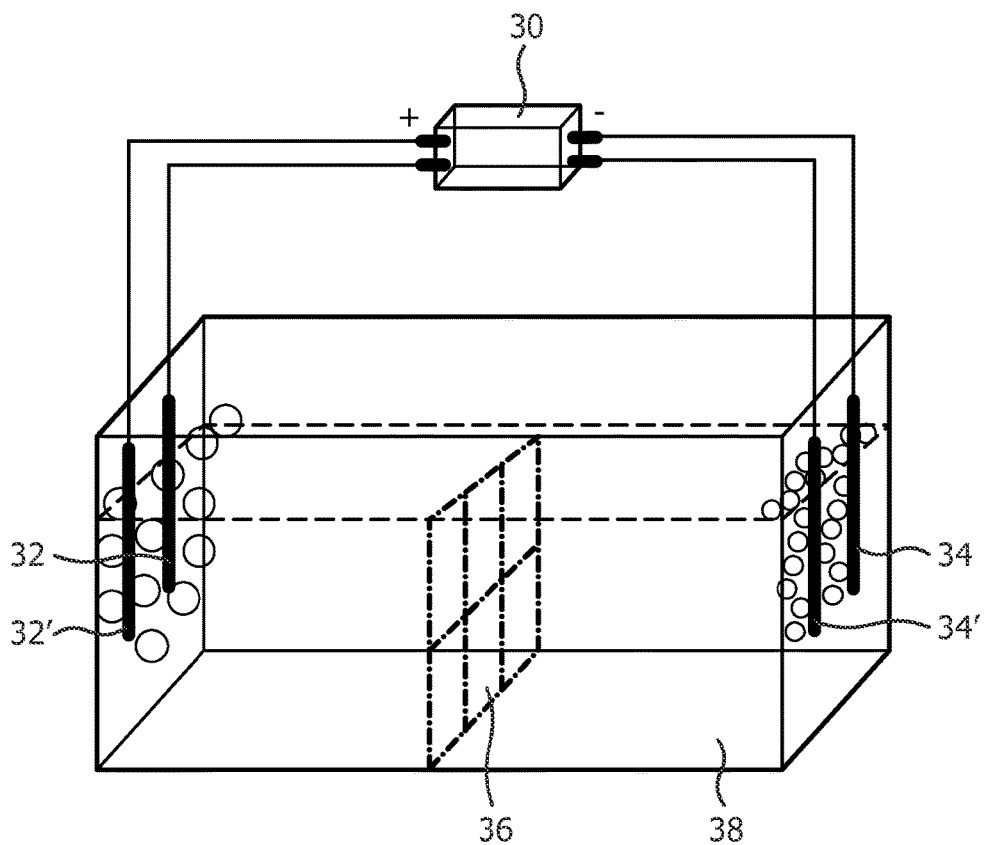
FIG. 3 shows a schematic view of the second unit with different anodes and cathodes.

FIG. 3 shows a schematic view of the electrolyzer 120. The electrolyzer 120 comprises:

a DC electric source 30;

at least two anodes 32, 32' with different features and/or at least two cathodes 34, 34' with different features, which are coupled to the DC electric source 30.

And the controller 14 is further configured to select, for electrolyzing the electrolyte 38, at least one anode and/or at least one cathode according to the characteristic of the gas.

There could preferably be a membrane 36 between the anodes and the cathodes for separating the cations and anions.

In one embodiment, the first unit 10 determines on which one or more electrodes the gas is to be generated as the characteristic of the gas, the electrolyzer 120 comprises at least two of an inert anode 32, a active metal anode 32' and an anode with double electric layer capacity 32", and/or the electrolyzer comprises an inert cathode 34, a metal cathode 34' and an cathode with double electric layer capacity 34".

Figure 4:
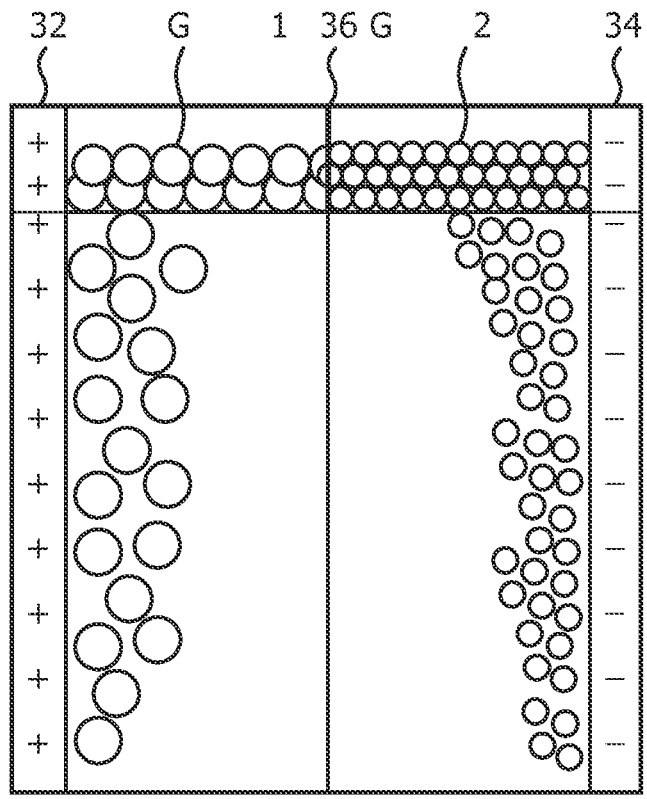
FIG. 4 shows an operation of the second unit with one inert anode and one inert cathode.

In a first embodiment, as shown in FIG. 4, the controller 14 applies electricity through one inert anode 32 and one inert cathode 34 or metal cathode 34'. Gas G1 is generated at the anode 32, and gas G2 is generated at the cathode 34. In one example, neural water is used as the electrolyte, and the gas G1 is oxygen $O_2$ and gas G2 is hydrogen $H_2$. The electrolysis equation on the anode is:

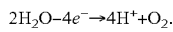

$$2H_2O - 4e^- \rightarrow 4H^+ + O_2.$$

And the electrolysis equation on the cathode is:

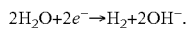

$$2H_2O + 2e^- \rightarrow H_2 + 2OH^-.$$

In this example, the water is added with a surfactant, thus the foam enriched with $O_2$ is formed from the bubbles on a surface of the water at the anode 32, and the foam enriched with $H_2$ is formed from the bubbles on a surface of the water at the cathode 34. In one embodiment, the apparatus further comprises a separator 36 between the anode 32 and the cathode 34 for avoiding the two foams mixed. If the foams are required to be mixed, the separator 36 can be removed.

Figure 5:
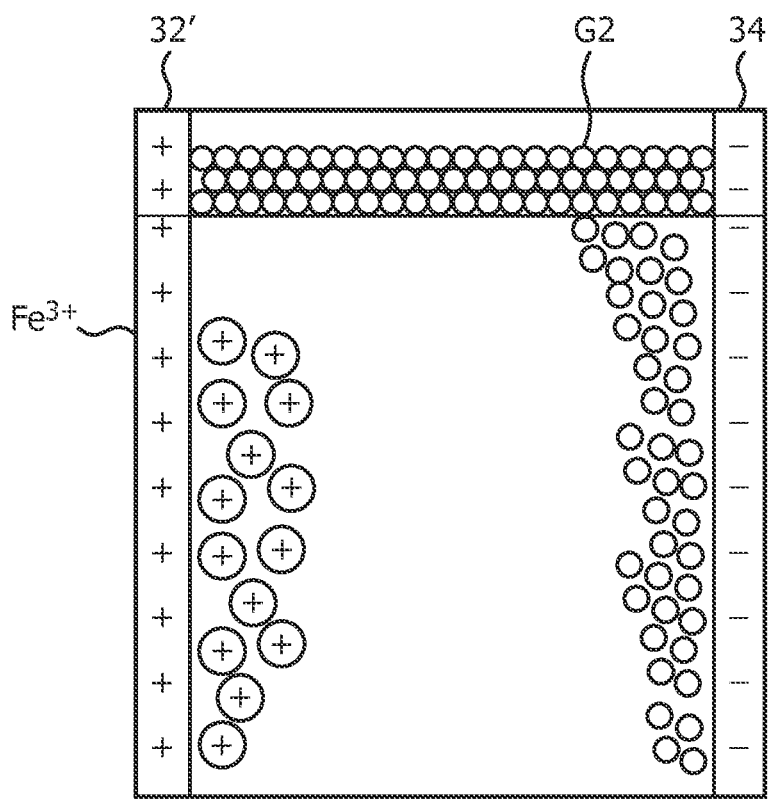
FIG. 5 shows an operation of the second unit with one active metal anode and one cathode.

In a second embodiment, as shown in FIG. 5, the controller 14 applies electricity through one active metal anode 32' and one inert cathode 34 or one metal cathode 34'. Gas G2 could be generated on the cathode. On the anode, the active metal will lose electron and release metal ions. Thus there is no gas generated on the anode 32'. The active metal should be more active than hydrogen. According to the chemical activity, K>Ca>Na>Mg>Al>Zn>Fe(>H)>Cu>Pt>Au. Thus an active metal anode made from Al, Zn and Fe can be used. The electrolyte filled in container could be water or an acid solution. For example, using Fe as electrode, the electrolyte is with acidity, and the electrolysis would only generate $H_2$ gas on the cathode 34, while $Fe^{3+}$ would be generated on the anode 32'.

The electrolysis equation on the anode is:

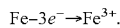

$$Fe - 3e^- \rightarrow Fe^{3+}.$$

And the electrolysis equation on the cathode is:

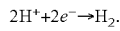

$$2H^+ + 2e^- \rightarrow H_2.$$

Figure 6A:
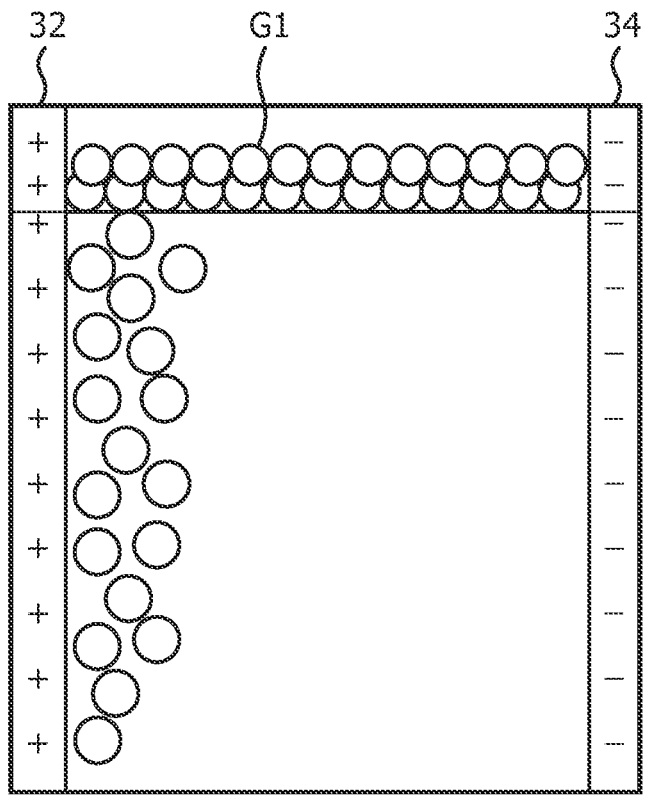
FIG. 6a shows an operation of the second units with one inert cathode and one anode with double electric layer capacity.
Figure 6B:
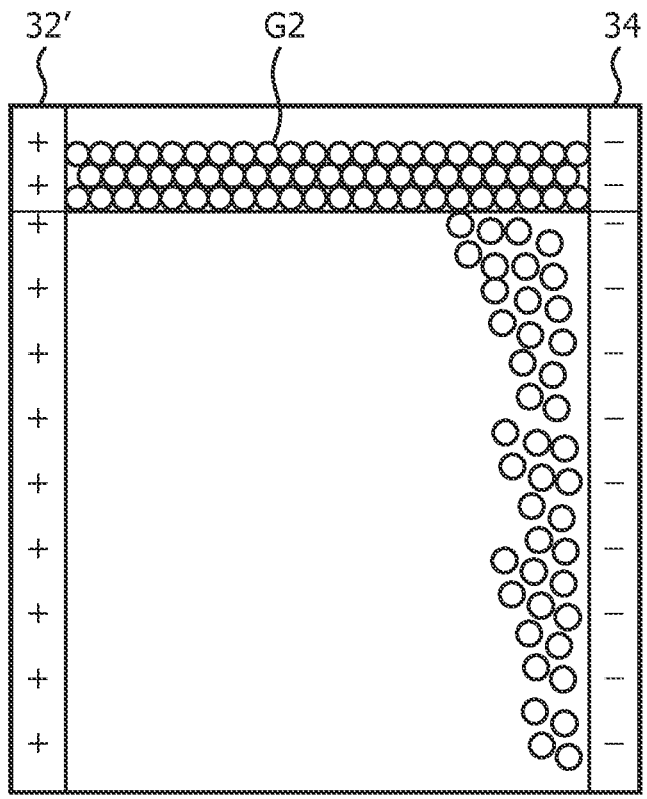
FIG. 6b shows an operation of the second units with one inert anode and one cathode with double electric layer capacity.

In a third embodiment, the anode or cathode is with the material which has Double Electric Layer Capacity character such an activated carbon. As shown in FIG. 6a, the controller 14 applies electricity through one inert anode 32 and cathode 34" with double electric layer capacity. The cathode 34" with double electric layer capacity will adsorb ions in water, therefore the reaction that gas should have been generated on the cathode would stop. In FIG. 6a, only gas G1 could be generated on the anode 32. In a varied embodiment, the controller 14 applies electricity through one anode 32" with double electric layer capacity and one inert cathode 34 or metal cathode 34'. In this embodiment, only gas G2 will be generated on the cathode, as shown in FIG. 6b.

In another embodiment, the electrolyzer 120 comprises at least two anodes in different sizes and/or shapes, and/or at least two cathodes in different sizes and/or shapes, the first unit determines an mount of gas in each bubble and/or a tininess of the bubbles as the characteristic of the gas, and the controller is further configured to select at least one said anode and/or at least one said cathode according to the characteristic of the gas. The shapes of the electrodes can be needle or plate. Electrodes with different sizes and/or shapes could generate bubbles in different tininess, namely provide different amount of gas in the bubbles. And this in turn could form foams with different tininess. The controller 14 selects an anode and/or a cathode with a proper size and/or shape, and the bubbles with a certain tininess can be generated on the anode and/or the cathode.

As to the method aspect corresponding to the above technical solution, the characteristic of the gas comprises an mount of gas in each bubble and/or a tininess of the bubbles, the generating step further comprises: selecting, for electrolyzing the electrolyte, at least one anode from at least two anodes with different sizes and/or shapes and/or at least one cathode from at least two cathodes with different sizes and/or shapes according to the characteristic of the gas.

In one embodiment of the invention, the first unit 10 determines an amount of gas in each bubble and/or a tininess of the bubbles as the characteristic of the gas, and the controller 14 is further configured to control a current and/or voltage used by the electrolyzer 120 for the electrolyzing, according to the characteristic of the gas. Experiments have shown that: given the same area of the electrodes, the higher the amplitude of the current is, the smaller the diameter of the bubble is (Guohua Chen, Separation and Purification Technology, Volume 38, Issue 1, 15 Jul. 2004, Pages 11-41). Therefore, by controlling the current and/or voltage, the apparatus can generate bubbles with a required an amount of gas in each bubble and/or a tininess of the bubbles.

In one embodiment of the invention, the apparatus is used for generating foams. The first unit 10 determines an amount of the foam formed from the bubbles, and the second unit 12 further comprises:

a surface activity unit configured to provide the bubbles with the surface activity, comprising at lease one of:

a dispenser configured to dispense surfactants into the electrolyte, and the controller 14 controls a type and/or a concentration of the surfactant according to the amount of the foam; or an intermediate infrared source configured to generate a radiation of intermediate infrared to the bubbles, and the controller 14 controls an applying duration and/or a strength of radiation of the source according to the amount of the foam; or a magnet module configured to yield a magnetic field for the bubble, and the controller 14 controls an applying duration and/or a strength of the magnetic field of the magnet module according to the amount of the foam.

In this embodiment, the amount of the foams can be controlled, thus the apparatus has wide applicability.

The following description will elucidate the generation of different types of gases in the bubbles for different usage in the apparatus.

In one embodiment, this diversity is implemented by different voltage of the electrolyzer 120. The first unit 10 determines a type of the gas in the bubbles and/or a usage of the bubbles as the characteristic of the gas, and the controller 14 is further configured to control a voltage used by the electrolyzer 120 for the electrolyzing, according to the characteristic of the gas. For example, as shown in FIG. 3, in one case, for a usage of skin care, the apparatus is used to generate oxygen $O_2$ enriched bubbles. The first unit 10 determines this usage and/or the type of the gas, and controls the electrolyzer 120 to use a normal voltage that is suitable for generating oxygen. In another case, for a usage of disinfection, the apparatus is used to generate ozone $O_3$ enriched bubbles. The first unit 10 determines this usage and/or the type of the gas, and controls the electrolyzer 120 to use an increased voltage that is suitable for generating ozone.

In another embodiment, this diversity is implemented via electrolyzing different electrolytes. The first unit 10 determines a type of the gas in the bubbles and/or a usage of the bubbles as the characteristic of the gas, the second unit 12 further comprises an electrolyte source of at least two types of electrolytes, and the controller 14 controls the electrolyte source to provide at least one said electrolyte according to the characteristic of the gas. For example, for a usage of disinfection, the apparatus is used to generate chlorine $Cl_2$ enriched bubbles. Then the controller 14 controls the electrolyte source to provide a solution of chloride, such as NaCl, as the electrolyte. Chlorine $Cl_2$ will be generated on the anode. And for a usage of skin care, the apparatus is used to generate oxygen $O_2$ enriched bubbles. Then the controller 14 controls the electrolyte source to provide pure water as the electrolyte. Oxygen $O_2$ will be generated on the anode.

As to the electrolyte source, in one embodiment, it could comprise:

a tank for containing pure water; and at least one unit, each unit being configured to contain a corresponding salt such as chloride and add the salt into the water in the tank.

The controller 14 selects and manipulates the at least one unit to or not to add salts in the water, according to the gas types and/or the usage of the bubbles, to provide pure water or solution of the salt.

In another more controllable and flexible embodiment, the electrolyte source comprises:
  at least one cation releasing module, each of which is configured to release at least one type of cations;
  at least one anion releasing module, each of which is configured to release at least one type of anions;
  the controller is configured to:
  determine a type of cation to release and/or a type of anion to release according to the characteristic of the gas; and
  select and manipulate at least one said cation releasing module and/or at least one said anion releasing module according to the determined types of the cations and/or anions.

Figure 7:
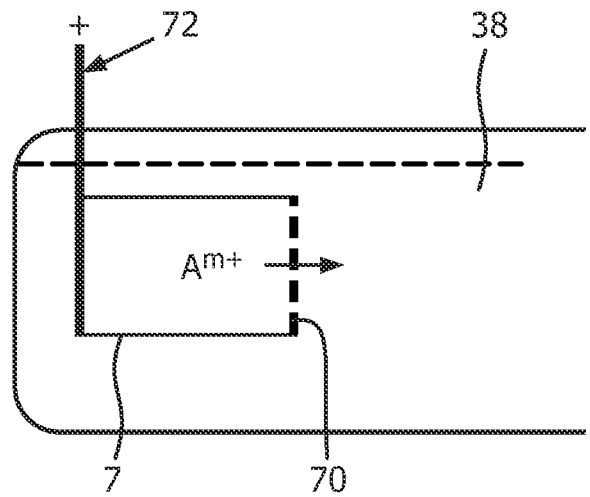
FIG. 7 shows a schematic view of one cation releasing module according to one embodiment of the invention.

As to the cation releasing module, in one specific embodiment as shown in FIG. 7, the cation releasing module comprises a first container 7 for containing a first solution containing a type of cation $A^{m+}$, and the first container 7 is for example immersing into the electrolyte 38. The first container 7 has a layer 70 of cationic membrane for separating the first solution with the electrolyte 38, and the cation releasing module comprises an anode 72 with one end immersing in the first solution and the other end connected to the controller 14 which is configured to apply a positive voltage in the first solution such that said cations $A^{m+}$ are released into the electrolyte 38 through the cationic membrane 72. As cations $A^{m+}$ are driven out of the first solution, cations $H^+$ are generated around the anode 72 thus the electric neutrality in the first solution is maintained.

Figure 8:
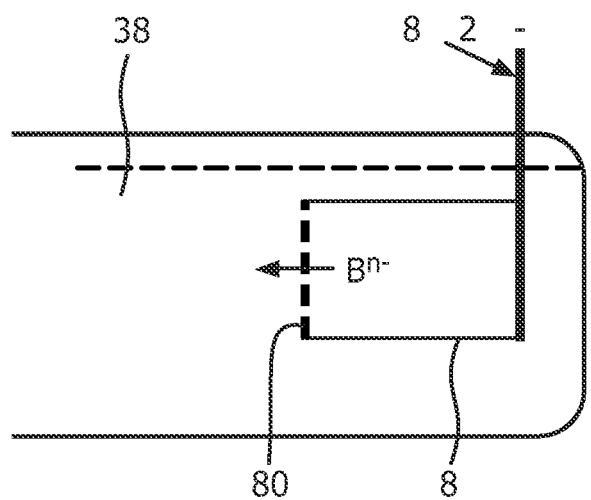
FIG. 8 shows a schematic view of one anion releasing module according to one embodiment of the invention.

Similarly, as to the anion releasing module, in one specific embodiment as shown in FIG. 8, the anion releasing module comprises a second container 8 for containing a second solution containing a type of anion $B^{n-}$, and the second container 4 is for example immersing into the electrolyte 38. The second container 4 has a layer 80 of anionic membrane for separating the second solution with the electrolyte 38, and the cation releasing module comprises a cathode 82 with one end immersing in the second solution and the other end connected to the controller 14 which is configured to apply a negative voltage in the second solution such that said anion $B^{n-}$ are released into the electrolyte 38 through the anionic membrane 82. As anions $B^{n-}$ are driven out of the second solution, anions $OH^-$ are generated around the cathode 82 thus the electric neutrality in the second solution is maintained.

There are other alternative embodiments for the cation releasing module. In one example, materials that can release cations under an electrical control could be used as the cation releasing module, such as polymer, gel. Specifically, the cation complexed polymer and/or gel storing the cation is immersing in the electrolyte, and the controller 14 is configured to electrolyze water in the electrolyte and generate $H^+$ cations. The $H^+$ cations enter into the cation complexed polymer and/or gel and exchange the stored cation out of the polymer and/or gel under the effect of the electric field, and the stored of cation enters into the electrolyte under the effect of the electric field.

Similarly, there are other alternative embodiments for the anion releasing module. In one example, materials that can release anions under an electrical control could be used as the anion releasing module, such as polymer, gel. Specifically, the anions complexed polymer and/or gel storing the anions is immersing in the electrolyte, and the controller 14 is configured to electrolyze water in the electrolyte and generate $OH^-$ anions. The $OH^-$ anions enter into the anion complexed polymer and/or gel and exchange the stored anions out of the polymers and/or gels under the effect of the electric field, and the stored anion enters into the electrolyte under the effect of the electric field.

As to the method aspect corresponding to the above technical solution, the determining step determines a type of the gas in the bubbles and/or a usage of the bubbles as the characteristic of the gas, the method further comprising the step before the electrolyzing step: providing at least one electrolyte from at least two kinds of electrolytes according to the characteristic of the gas.

In the above embodiment, the gas is a direct product of the electrolysis of the electrolyte. In a varied embodiment, the gas is generated from a reaction between a product of the electrolysis and a chemical. In this embodiment, the first unit 10 determines a type of the gas in the bubbles and/or a usage of the bubbles as the characteristic of the gas, and the second unit 12 further comprises:
  a chemical adding unit configured to add at least two kinds of chemicals into the electrolyte, each of which reacts with a product of the electrolyzing of the electrolyte to generate the gas;
  and the controller 14 is further configured to control the chemical adding unit to add at least one said chemical according to the characteristic of the gas.

Figure 9:
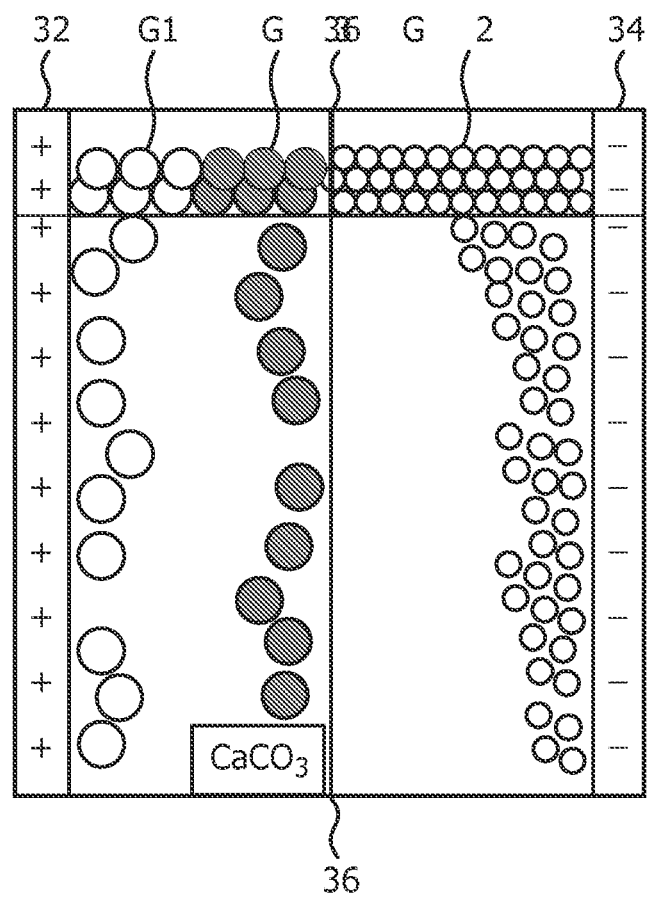
FIG. 9 shows an operation of the second unit according to another embodiment of the invention.

In an example as shown in FIG. 9, to generate some carbon dioxide $CO_2$, the chemical adding unit adds some calcium carbonate $CaCO_3$ in the electrolyte near the anode 32. On the anode 32, similarly as the embodiment as shown in FIG. 3, not only oxygen but also $H^+$ cations are generated as the product of the electrolysis, and the $H^+$ cations reacts with the calcium carbonate $CaCO_3$ to generate the carbon dioxide $CO_2$.

As to the first unit 10, it can have various implementations. In one embodiment, the first unit 10 comprises a user interface configured to receive the characteristic of the gas from a user. For example, the user can select the type of the gas and/or the usage by pressing buttons on a panel of the apparatus. In another embodiment, the first unit 10 comprises a machine-to-machine interface configured to receive the characteristic from a device adapted to utilize the bubbles, such as a washing machine.

The controller 14 can be implemented by a MCU. The rules for the controller 14 to control the second unit 12 according to the characteristic of the gas, such as different selection of electrodes according to different amount of gas in the bubble, or different amplitude of voltage according to different type of gas, can be pre-stored or downloaded in a memory and load by the MCU. Those ordinary skilled in the art could understand and realize modifications to the disclosed embodiments, through studying the description, drawings and appended claims. All such modifications which do not depart from the spirit of the invention are intended to be included within the scope of the appended claims.

The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim.

What is claimed is:
1. An apparatus for generating bubbles, comprising:
  a first unit configured to determine at least one characteristic of a gas in the bubbles to be generated, wherein the at least one characteristic of the gas comprises (i) a type of the gas in the bubbles and (ii) a usage of the bubbles, wherein the type of the gas and usage of the bubbles is determined from at least one of (a) a user selection via a user interface, and (b) a device adapted to utilize the bubbles, via a machine-to-machine interface;

a second unit configured to generate the bubbles, wherein the second unit comprises (i) an electrolyzer configured to electrolyze an electrolyte to generate the gas in the electrolyte, and thereby generate the bubbles, and (ii) an electrolyte source of at least two types of additional electrolytes; and a controller configured to control the second unit to generate the bubbles according to the determined at least one characteristic of the gas, wherein the controller controls the electrolyte source to provide at least one additional electrolyte to said electrolyte, wherein the at least one additional electrolyte is selected from the at least two types of additional electrolytes according to the determined at least one characteristic of the gas.

2. The apparatus according to claim 1, wherein the electrolyzer comprises:

a DC electric source; and at least two anodes with different features and/or at least two cathodes with different features, wherein the at least two anodes and/or the at least two cathodes are coupled to the DC electric source;

wherein the controller is further configured to select, for electrolyzing the electrolyte, at least one anode of the at least two anodes and/or at least one cathode of the at least two cathodes according to the determined at least one characteristic of the gas.

3. The apparatus according to claim 2, wherein the electrolyzer comprises at least one of anodes and cathodes selected from the group consisting of (a) at least two of (i) an inert anode, (ii) an active metal anode and (iii) an anode with double electric layer capacity, and (b) at least two of (i) an inert cathode, (ii) a metal cathode and (iii) an cathode with double electric layer capacity, wherein the at least one characteristic of the gas further comprises a selection on which one or more of the anodes and cathodes the gas is to be generated, and wherein the second unit further comprises a separator between the anodes and the cathodes for preventing bubbles that are generated respectively on the anodes and the cathodes from mixing with each other.

4. The apparatus according to claim 2, wherein the electrolyzer comprises at least one of anodes and cathodes selected from the group consisting of (a) at least two anodes in different sizes and/or shapes, and (b) at least two cathodes in different sizes and/or shapes, wherein the at least one characteristic of the gas further comprises an amount of the gas in each bubble and/or a tininess of the bubbles, and wherein the controller is further configured to select (i) at least one anode of the at least two anodes in different sizes and/or shapes and/or (ii) at least one cathode of the at least two cathodes in different sizes and/or shapes, according to the determined at least one characteristic of the gas.

5. The apparatus according to claim 1, wherein the at least on characteristic of the gas further comprises an amount of the gas in each bubble and/or a tininess of the bubbles, and wherein the controller is further configured to control a current and/or voltage used by the electrolyzer for the electrolyzing, according to the determined at least one characteristic of the gas.

6. The apparatus according to claim 1, wherein the apparatus is further for use in generating foams from the generated bubbles, wherein the electrolyte includes one or more surfactant, or the first unit is further configured to determine an amount of the foam, and the second unit further comprises:

a surface activity unit configured to provide the generated bubbles with a surface activity that includes at least one of:

(i) a dispenser configured to dispense surfactants into the electrolyte, wherein the controller further controls a type and/or a concentration of a surfactant, dispensed via the dispenser, according to the determined amount of the foam; or (ii) an intermediate infrared source configured to generate a radiation of intermediate infrared to the bubbles, wherein the controller further controls an application duration and/or a strength of radiation, generated via the intermediate infrared source, according to the determined amount of the foam; or (iii) a magnet module configured to yield a magnetic field for the bubbles, wherein the controller further controls an application duration and/or a strength of the magnetic field, yielded via the magnet module, according to the determined amount of the foam.

7. The apparatus according to claim 1, wherein the at least one characteristic of the as further comprises a type of the gas in the bubbles and/or a usage of the bubbles, wherein the controller is further configured to control a voltage used by the electrolyzer for the electrolyzing, according to the determined at least one characteristic of the gas.

8. The apparatus according to claim 1, wherein the electrolyte source comprises:

(i) at least one cation releasing module, wherein each of the at least one cation releasing module is configured to release at least one type of cations; and (ii) at least one anion releasing module, wherein each of the at least one anion releasing module is configured to release at least one type of anions, wherein the controller is further configured to:

(i) determine a type of cation to release and/or a type of anion to release according to the determined at least one characteristic of the gas; and (ii) select and manipulate at least one said cation releasing module and/or at least one said anion releasing module according to the determined types of the cations and/or anions.

9. The apparatus according to claim 8, wherein the cation releasing module comprises a first container for containing a first solution containing a first type of cation, the first container having a layer of cationic membrane for separating the first solution with the electrolyte, and wherein the controller is further configured to apply a positive voltage in the first solution such that said first type of cation is released into the electrolyte through the cationic membrane; and/or wherein the anion releasing module comprises a second container for containing a second solution containing a second type of anion, the second container having a layer of anionic membrane for separating the second solution with the electrolyte, and wherein the controller is further configured to apply a negative voltage in the second solution such that said second type of anion is released into the electrolyte through the anionic membrane.

10. The apparatus according to claim 8,
wherein the cation releasing module comprises a cation complexed polymer and/or gel storing the cation and configured to be immersed in the electrolyte,
wherein the controller is further configured to electrolyze water in the electrolyte and generate $H^+$ ions which enter the cation complexed polymer and/or gel and exchange said type of cation out of the polymer and/or gel and into the electrolyte; and/or
wherein the anion releasing module comprises an anion complexed polymer and/or gel storing the anion and configured to be immersed in the electrolyte,
wherein the controller is further configured to electrolyze water in the electrolyte and generate $OH^-$ ions which enter the anion complexed polymers and/or gels and exchange said type of anion out of the polymers and/or gels and into the electrolyte.

11. The apparatus according to claim 1, wherein the at least one characteristic of the gas further comprises a type of the gas in the bubbles and/or a usage of the bubbles, and
wherein the second unit further comprises:
a chemical adding unit configured to add at least two kinds of chemicals into the electrolyte, each of which reacts with a product of the electrolyzing of the electrolyte to generate the gas, and
wherein the controller is further configured to control the chemical adding unit to add at least one said chemical according to the determined at least one characteristic of the gas.

12. The apparatus according to claim 1, wherein the first unit comprises at least one of:
a user interface configured to receive the characteristic of the gas from a user; and
a machine-to-machine interface configured to receive the characteristic of the gas from a device adapted to utilize the bubbles.

13. A method for generating bubbles, wherein the method is carried out by an apparatus according to claim 1.

* * * * *